US008005495B2

(12) United States Patent
Vaananen

(10) Patent No.: US 8,005,495 B2
(45) Date of Patent: *Aug. 23, 2011

(54) ELECTRONIC SHORT MESSAGING AND ADVERTISING METHOD AND DEVICE

(75) Inventor: Mikko Kalervo Vaananen, Helsinki (FI)

(73) Assignee: Open Invention Network, LLC, Durham, NC (US)

( * ) Notice: Subject to any disclaimer, the term of this patent is extended or adjusted under 35 U.S.C. 154(b) by 64 days.

This patent is subject to a terminal disclaimer.

(21) Appl. No.: 12/401,052

(22) Filed: Mar. 10, 2009

(65) Prior Publication Data
US 2009/0181704 A1  Jul. 16, 2009

Related U.S. Application Data

(63) Continuation of application No. 11/979,141, filed on Oct. 31, 2007.

(30) Foreign Application Priority Data

Nov. 8, 2000 (FI) .................................. 20002441
Nov. 7, 2001 (WO) ....................... PCT/FI01/00967

(51) Int. Cl.
*H04Q 1/00* (2006.01)
(52) U.S. Cl. ...................... 455/466; 455/406; 455/405
(58) Field of Classification Search ............... 455/412.1, 455/412.2, 414.1, 415, 417, 432.3, 433, 458, 455/517, 460, 466, 405, 406; 379/98.12, 379/93.17; 705/39
See application file for complete search history.

(56) References Cited

U.S. PATENT DOCUMENTS

| 5,283,856 | A | 2/1994 | Gross et al. |
| 5,786,817 | A | 7/1998 | Sakano et al. |
| 5,852,775 | A | 12/1998 | Hidary |
| 5,987,424 | A * | 11/1999 | Nakamura ................. 705/14.39 |
| 6,064,376 | A | 5/2000 | Berezowski et al. |
| 6,138,006 | A | 10/2000 | Foti |
| 6,141,547 | A | 10/2000 | Rousseau et al. |
| 6,222,520 | B1 | 4/2001 | Gerszberg et al. |
| 6,396,531 | B1 | 5/2002 | Gerszberg et al. |
| 6,459,440 | B1 | 10/2002 | Monnes et al. |
| 6,470,181 | B1 | 10/2002 | Maxwell |
| 6,493,437 | B1 | 12/2002 | Olshansky |
| 6,505,046 | B1 | 1/2003 | Baker |
| 6,567,854 | B1 * | 5/2003 | Olshansky et al. ........... 709/229 |
| 6,721,795 | B1 | 4/2004 | Eldreth |

(Continued)

FOREIGN PATENT DOCUMENTS
WO     WO0122243 A1    3/2001
(Continued)

*Primary Examiner* — Jean A Gelin
(74) *Attorney, Agent, or Firm* — Williams Mullen

(57) ABSTRACT

The invention relates to an electronic short messaging and advertising method where minimal initiative is required from the consumer. Some embodiments of the invention may also be applied to an electronic sales method. The invention may also be applied for normal short messaging. The electronic short messaging method for collect calling may send transmissions to at least one subscriber terminal via the Internet and/or the telephony network. The method may include sending a first transmission to a recipient subscriber terminal for display, wherein the first transmission defines one or more active alternatives including at least one of initiating a collect call and deleting the first transmission. The method may also include calculating costs associated with at least one of the first transmission and the one or more active alternatives.

18 Claims, 5 Drawing Sheets

U.S. PATENT DOCUMENTS

| | | |
|---|---|---|
| 6,826,407 B1 | 11/2004 | Helferich |
| 6,891,811 B1 * | 5/2005 | Smith et al. .................. 370/310 |
| 7,428,510 B2 * | 9/2008 | Titus et al. ..................... 705/39 |
| 2004/0093376 A1 | 5/2004 | De Boor et al. |
| 2005/0075932 A1 * | 4/2005 | Mankoff ........................ 705/14 |
| 2008/0153523 A1 * | 6/2008 | Febonio et al. ............... 455/466 |
| 2010/0306064 A1 | 12/2010 | Inselburg |

FOREIGN PATENT DOCUMENTS

| | | |
|---|---|---|
| WO | WO0143019 A1 | 6/2001 |

* cited by examiner

ELECTRONIC SHORT MESSAGING AND ADVERTISING METHOD AND DEVICE

CROSS-REFERENCE TO RELATED APPLICATIONS

This application is a continuation of U.S. application Ser. No. 11/979,141 filed Oct. 31, 2007, now U.S. Application Publication No. 20080064426, which is incorporated herein in its entirety.

BACKGROUND OF THE INVENTION

The invention relates to an electronic short messaging method and device suitable, for example, for advertising. In particular the invention relates to an electronic short messaging method and device for advertising where minimal initiative is required from the consumer. Some embodiments of the invention may also be applied to an electronic sales method. The invention may be also applied for normal short messaging.

In the related art, electronic advertising methods advertisements are typically delivered by email or SMS messages. Emails may contain hyperlinks to advertising sites. SMS messages may contain telephone numbers of advertisers.

The related art has several disadvantages. The response to both types of advertisements requires active participation from the consumer. A hyperlink needs to be identified and clicked. A telephone number needs to be entered to a mobile station by copying it from the SMS message or by entering it manually. The SMS advertiser typically wants to be contacted by telephone, because the user holds a telephone. The email advertiser wants the user to visit a URL address, because the user is using a computer.

The purpose of the invention is to remove the aforementioned disadvantages. The invention requires zero initiative from the user to respond to a short message or an advertisement. Whether the advertisement is communicated by SMS or email makes no difference to the referral.

SUMMARY OF THE INVENTION

Most or all of the aforementioned advantages of the invention are implemented with exemplary embodiments of the invention, in which a message, like an email or an SMS message is sent to a subscriber terminal. Preferably, software on the subscriber terminal recognizes the arrival of the email or SMS-message from a unique identifier. A part of the message displaying an advertisement is displayed to the screen of the subscriber terminal, like "New Pirelli tires 100 dollars, interested Yes/No?" By pressing a dedicated key for "No" the message is deleted and the screen returns to the normal state. By pressing a dedicated key for "Yes" the subscriber terminal connects to an IP-address or an URL where the advertising is continued by displaying web pages, video and/or audio depicting the advertisement. Alternatively the subscriber terminal dials a telephone number to a sales representative. The subscriber terminal may also form a packet switched real time communication connection to a sales representative through the Internet.

It is an object of the present invention to provide an electronic short messaging method for collect calling by sending transmissions to at least one subscriber terminal via the Internet and/or the telephony network. The method may include sending a first transmission to a recipient subscriber terminal for display, wherein the first transmission defines one or more active alternatives including at least one of initiating a collect call and deleting the transmission. In some embodiments, costs associated with at least one of the first transmission and the one or more active alternatives may be calculated.

In one exemplary embodiment, the first transmission defines automatic deletion after a predefined time period after reception unless one of the active alternatives is selected.

In another exemplary embodiment, after a predefined period, a second transmission is sent to the recipient subscriber terminal unless the first alternative is selected, said second transmission removing the first transmission from display.

It is a further object of the present invention to provide an electronic short messaging device. The electronic short message device may comprise: a transmitter and receiver structured to communicate using at least one of a packet switched connection and telephony network connection; at least one display device; and a processor structured to identify incoming transmissions and process the transmissions for displaying at least a part of the content of the transmission on the display device directly or at predetermined intervals, wherein the processor is further structured to process a first transmission of the transmissions, the first transmission defining one or more active alternatives including at least one of initiating a collect call and deleting the transmission, and calculate costs associated with at least one of the first transmission and the one or more active alternatives.

It is still a further object of the present invention to provide a computer readable medium for collect calling, the computer readable medium including computer-executable instructions, the instructions for: receiving a first transmission at a recipient subscriber terminal for display, the first transmission defining one or more active alternatives executed by the instructions including at least one of initiating a collect call and deleting the transmission, and calculating costs associated with at least one of the first transmission and the one or more active alternatives.

In an exemplary embodiment, the computer readable medium may further include instructions for receiving a second transmission that is associated with the first transmission, wherein the second transmission includes attributes including at least one of further actions to initiate the collect call and a state of the first transmission.

In another exemplary embodiment of the computer readable medium, the further actions include connecting to at least one of a telephone number, an IP-address, and a URL related to the collect call.

BRIEF DESCRIPTION OF THE DRAWINGS

In the following the invention will be described in greater detail with reference to exemplary embodiments in accordance with the accompanying drawings, in which.

DETAILED DESCRIPTION OF THE INVENTION

Figure 1:
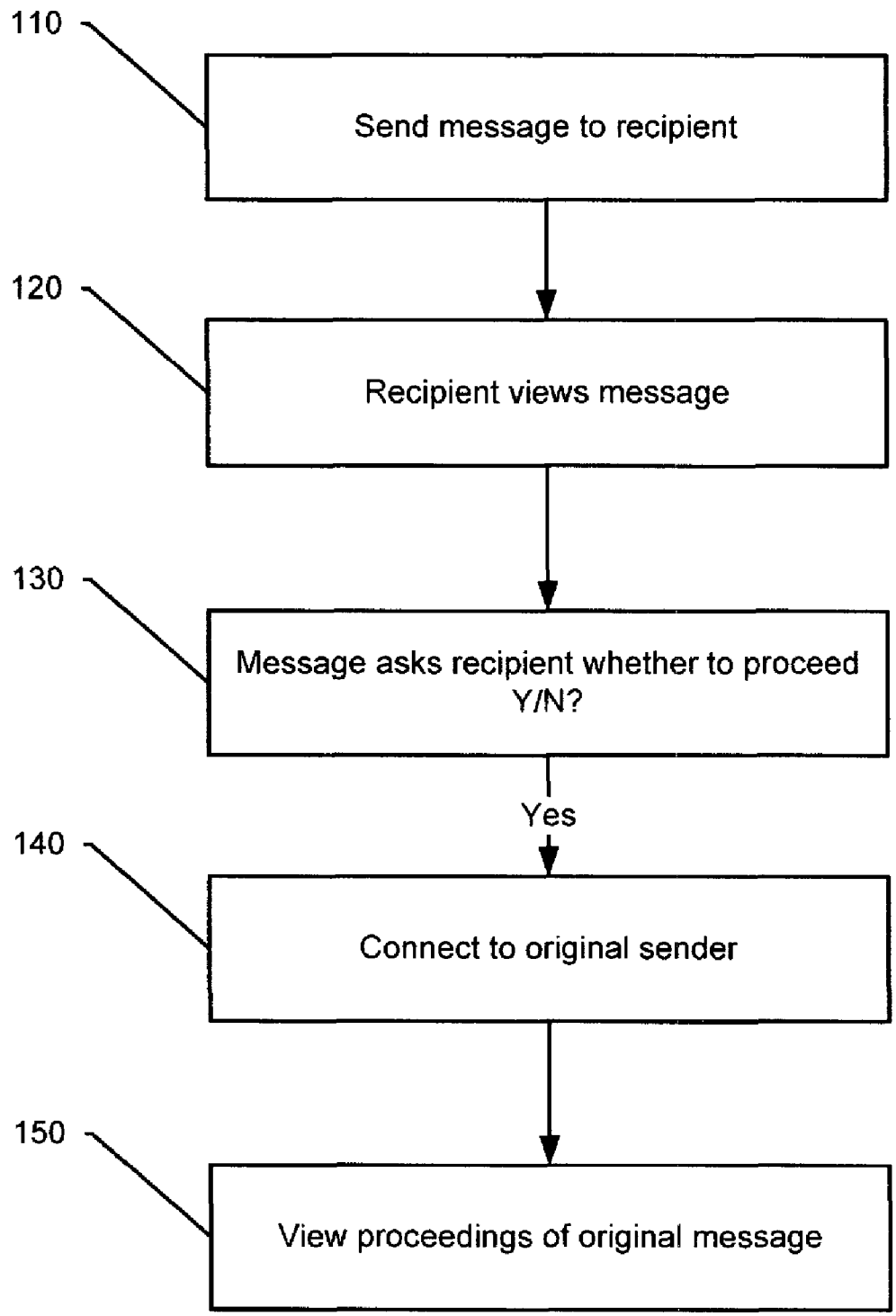
FIG. 1 presents one exemplary embodiment of the invention as a flow diagram.

In phase 110 of FIG. 1 a message is sent to the recipient subscriber terminal typically by SMS (Short Message Service), SMS containing a bitmap, MMS (Multimedia Messaging Service) or email. In some exemplary embodiments, the subscriber terminal is typically a PC computer, Apple Macintosh computer, a PDA (Personal Digital Assistant) or a UMTS-, GSM-, WAP-, Teldesic-, Inmarsat-, Iridium-, GPRS-, CDMA-, GPS- and/or WCDMA mobile station. Typically in some exemplary embodiments, the subscriber terminal is a device using either the Microsoft Windows, Windows NT, Windows CE, Windows Pocket PC, GEOS, Palm OS or the Epoc operating system. In many exemplary embodiments several default facilities of the operating system are used to realize the inventive method.

In some exemplary embodiments all messages may be delivered to the same inbox. The recipient views the message from the inbox. The message will contain a referral like "Pirelli tyres 100$, interested Y/N?, if yes please press X." Once the user presses X, or any other dedicated key depicted by the message, he is connected to the original sender of the message in phase 140. If he does something else, or nothing for some time, the message may be deleted or postponed.

In some mobile device, there is a pair of key buttons for selecting the bioptional alternatives the normal operation of the mobile device involves. For example mobile telephones or PDAs have this kind of key button pairs. This pair of keys is advantageously used for selecting the bioptional alternatives of messages in accordance with the invention.

A telephone connection may be formed automatically on the basis of the Caller ID. In some embodiments a hyperlink, IP address and/or URL address of the sender may be designated in the message and thus contacted through the Internet in accordance with the inventive method. In some exemplary embodiments of the invention a pop-up function is defined in the message. Once the message is received it is instantly popped up on the subscriber terminal screen. For example in a smartphone containing two displays, like the Nokia Communicator, the message or some parts of it is popped up on both or either displays. In a PC, the message is popped on the screen once the messages have been downloaded. In a GSM mobile station the message or some parts of it are displayed in place of the operator or cell logo or both. In both exemplary embodiments typically software is required to identify the message, and pop it on the screen. In some exemplary embodiments the software is able to identify embedded phone numbers, IP-addresses and/or URL addresses. Once "Yes" for the message is indicated, this aforementioned embedded directory information is read from the message and transferred to the communications part of the subscriber terminal.

After the user has been connected to the sender, he views, listens to and/or registers for proceedings in phase 150. In some exemplary embodiments the proceedings may be a further advertisement on a web page, an audio and/or video presentation, a conversation with a sales representative and/or a registration for the receipt of further information later by post, telephone, SMS and/or email.

In some exemplary embodiments this is used to automate collect calls. If a person sends a message of the type: "Please call me Y/N?", the recipient may launch a collect call by one press of a dedicated key. In these exemplary embodiments the arrival of the message typically launches a ring tone.

In some embodiments the method 10 is realized in a GSM network by sending a message in place of the operator logo on the terminal display. Alternatively SMS-CB (Cell Broadcast), USSD (Unstructured Supplementary Service Data), PDS (Packet Data on Signalling Channels) or WAPPush may be used to display the message directly on the screen. This message may contain instructions on an action to be taken if the logical response of the user is "Yes", for example it may contain a telephone number to which the user is connected, or it may trigger an SMS message from the user or a request for an SMS from the network or sender by USSD, SMS, or the like. A further message, linked to the original message of SMS, USSD, SMS-CB (Cell Broadcast) may be sent with the original message to contain these instructions in some embodiments.

Upon any stage the network may also destroy or change the said message by sending another message. In one embodiment, for example if the position of the user changes, the HLR/VLR (Home/Visitor Location Register) or an external location server may prompt the network or an external messaging server to send a new message to update the message on the terminal screen, or to delete the message on the terminal screen. A necessary change of position may be for example leaving or entering a cell.

Figure 2:
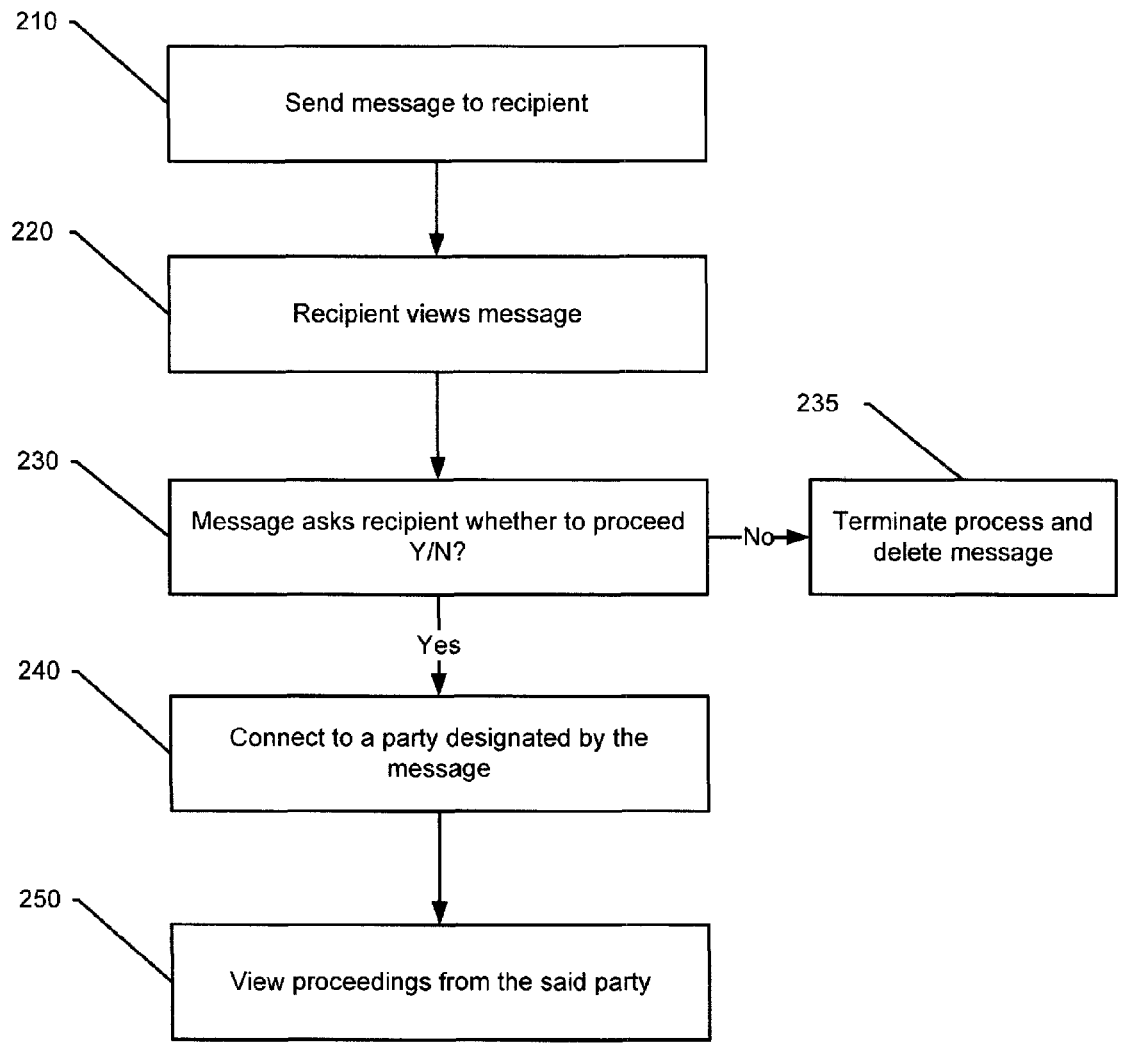
FIG. 2 presents a more general embodiment of the invention as a flow diagram.

In FIG. 2 the message is sent to the recipient subscriber terminal in phase 210. The recipient views the message in phase 220. In addition to SMS or email, the message can be delivered by FTP, TCP/IP, H323, HTTP, UDP or by some other direct transfer protocol, and a "pop-up" software recognizes the said transmissions or messages at the subscriber terminal.

In phase 230 the message provides the user with the option to proceed with further information related to the referral like "Pirelli tyres 100$, interested Y/N? Please press Y to proceed!" If the user chooses to press the designated key, Y in this case, he is connected to a third party designated by the message in phase 240.

If he does something else or nothing for some time, the process is terminated and the message is deleted or postponed. In some exemplary embodiments this is done by moving the message to the "Recycle bin" of the operating system of the subscriber terminal.

If the user chooses "Yes" by pressing a dedicated key or otherwise, he is connected to a third party designated by the message in phase 240. The message may have embedded phone numbers, IP-addresses, URL-addresses, ISDN-, FTP-, email-, SIP (Session Initiation Protocol)-addresses and/or other electronic directories to which the user is connected in some exemplary embodiments.

After the user has been connected to the third party, he views, listens to, downloads, uploads and/or registers for proceedings in phase 250. In some exemplary embodiments the proceedings may be a further advertisement on a web page, an audio and/or a video presentation, a conversation with a sales representative and/or a registration for the receival of further information later by post, telephone, SMS and/or email or a registration to a customer database for monitoring purposes.

In some embodiments the method 20 is realized in a cellular network by sending a message in place of the operator logo on the terminal display. Alternatively SMS-CB (Cell Broadcast), USSD, PDS (Packet Data on Signaling Channels) or WAPPush may be used to display the message directly on the screen. This message may contain instructions on an action to be taken if the logical response of the user is "Yes", for example it may contain a telephone number to which the user is connected, or it may trigger an SMS message from the user or a request for an SMS from the network or sender by USSD, SMS, or the like. A further message, linked to the original message of SMS, USSD, SMS-CB (Cell Broadcast) may be sent with the original message to contain these instructions in some embodiments. In some embodiments this further message precedes the actual message and initializes the device to display the message directly on the screen. Typically a second transmission is sent and received and associated with the first transmission, depicting attributes related to user input, further actions and/or state of the first transmission or any other attributes or instructions.

Upon any stage the network may also destroy or change the said message by sending another message. In one embodiment, for example if the position of the user changes, the HLR/VLR (Home/Visitor Location Register) or an external location server may prompt the network or an external messaging server to send a new message to update the message on the terminal screen, or to delete the message on the terminal screen. A necessary change of position may be for example leaving or entering a cell.

Especially when the first message is a USSD message, it is typical that the network, MSC, or an external server contains an USSD management application that administers the display, change and connection and/or response parameters of the messages on the user terminal displays.

In one embodiment the GSM terminal has dedicated software installed to run and administer the process of displaying messages. In one embodiment this software is realized as SIM Application Toolkit software on the SIM card of the mobile terminal, in another alternative embodiment it could be realized with a WAP-browser. This software recognizes messages, for example SMS, SMS-CB, USSD, PDS or WAPPush messages that are sent to the terminal, and displays the bioptional messages to the user on the display. The recognition is typically done from a unique identifier associated with the message, for example in the header of the message. In some embodiments an initialization message preceding the actual message may be used to set the terminal and associated software to a state where the incoming message(s) is displayed on the screen. If the user takes a dedicated action logically "Yes", the software will administer the proceedings.

Figure 3:
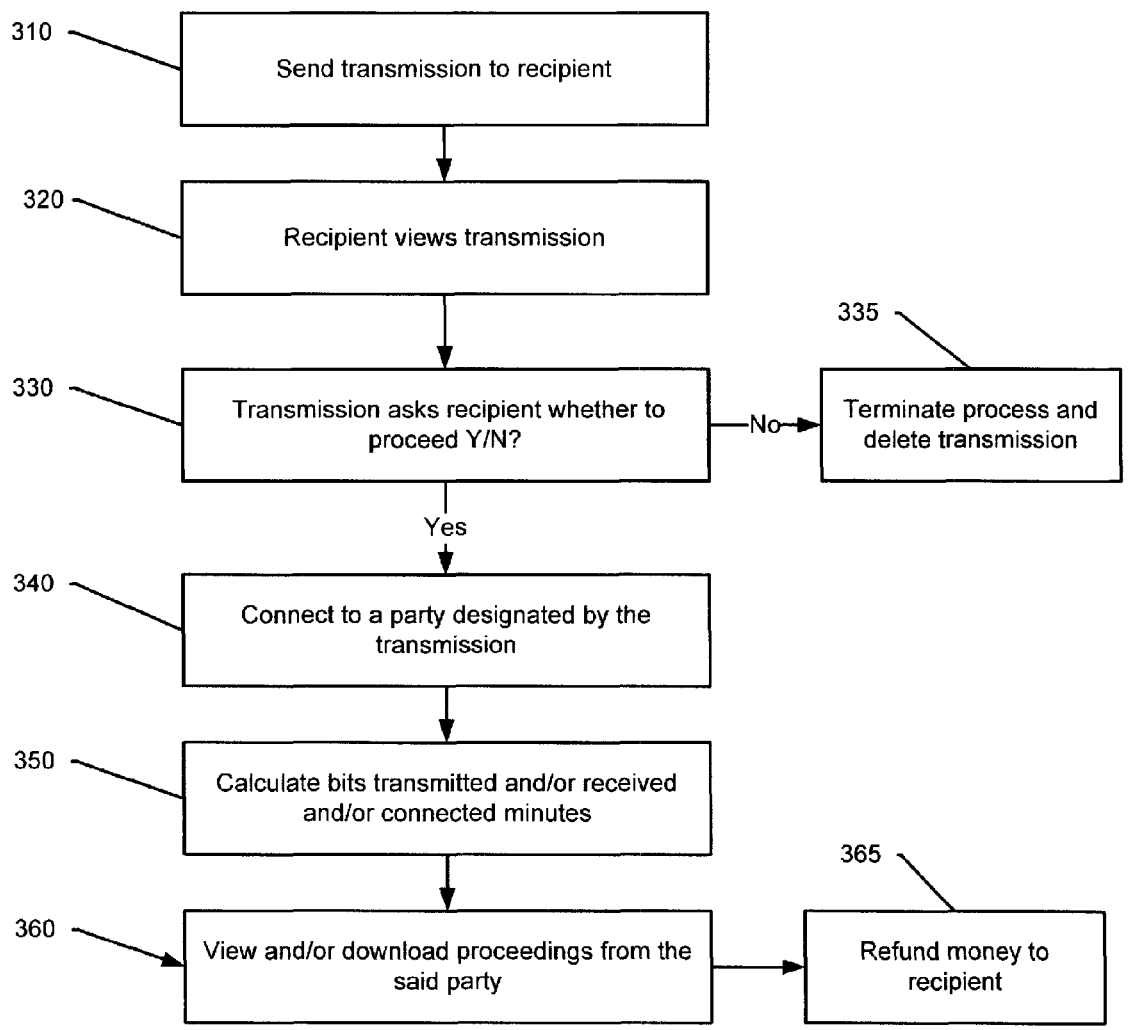
FIG. 3 presents a more developed embodiment of the invention as a flow diagram.

In phase 310 of FIG. 3 a transmission is sent to a recipient. The transmission may be a discrete message, but it may also be a continuous transmission and/or a real time transmission. Typically transmissions of this sort are realized by GPRS-, UMTS-FTP, TCP/IP, H323, HTTP, UDP or by some other direct data transfer protocol, and the said transmissions and/or messages are recognized at the subscriber terminal. The transmission may be a dynamic stream of e.g. IP-packets, or packets of any other protocol, and the reading and viewing of some of the packets may be begun even before the whole transmission has been received in some embodiments. In phase 320 the recipient views the transmission or some displayed parts of the transmission. In phase 330 the transmission or some parts of it are arranged to ask the recipient whether to proceed with further information. In some exemplary embodiments, the user may be promised money for viewing the advert. In some embodiments the message is of the type: "New product X, interested Y/N? The phone bill/download is on us!" In some exemplary embodiments, the message may be of the type: "New product X for 100$, interested Y/N? You get 1$ for viewing the advert!"

If "NO" the process is terminated and the message and/or transmission or some of its parts are deleted in phase 335. If "YES" the subscriber terminal automatically connects to a third party designated by the message. Any electronic address may be embedded in the transmission, in some exemplary embodiments.

In phase 350 the bits transmitted and/or received and/or connected minutes are calculated. The calculation may be done by software at the subscriber terminal or in the network or both.

After the user has been connected to the third party, he views, listens to, downloads, uploads and/or registers for proceedings in phase 360. In some exemplary embodiments the proceedings may be a further advertisement on a web page, an audio and/or a video presentation, a conversation with a sales representative and/or a registration for the receival of further information later by post, telephone, SMS and/or email or a registration to a customer database for monitoring purposes.

In some exemplary embodiments, the phases 350 and 360 overlap or are conducted simultaneously.

In phase 365, money can be refunded to the recipient on the basis of bits transmitted and/or received and/or connected minutes. In some exemplary embodiments, the amount of refund is based on the promise in the original message. In some exemplary embodiments the refund is made to the phone bill of the recipient. In some exemplary embodiments a cheque is posted to the owner of the subscriber terminal. In some exemplary embodiments, the user is given a discount on the price, monthly fee, and/or per minute and/or per bit rate if the user accepts to receive adverts on a continuous basis.

Same options for deleting or updating transmission streams or associating transmission streams with each other exist as with discrete messages in accordance with the invention.

Figure 4:
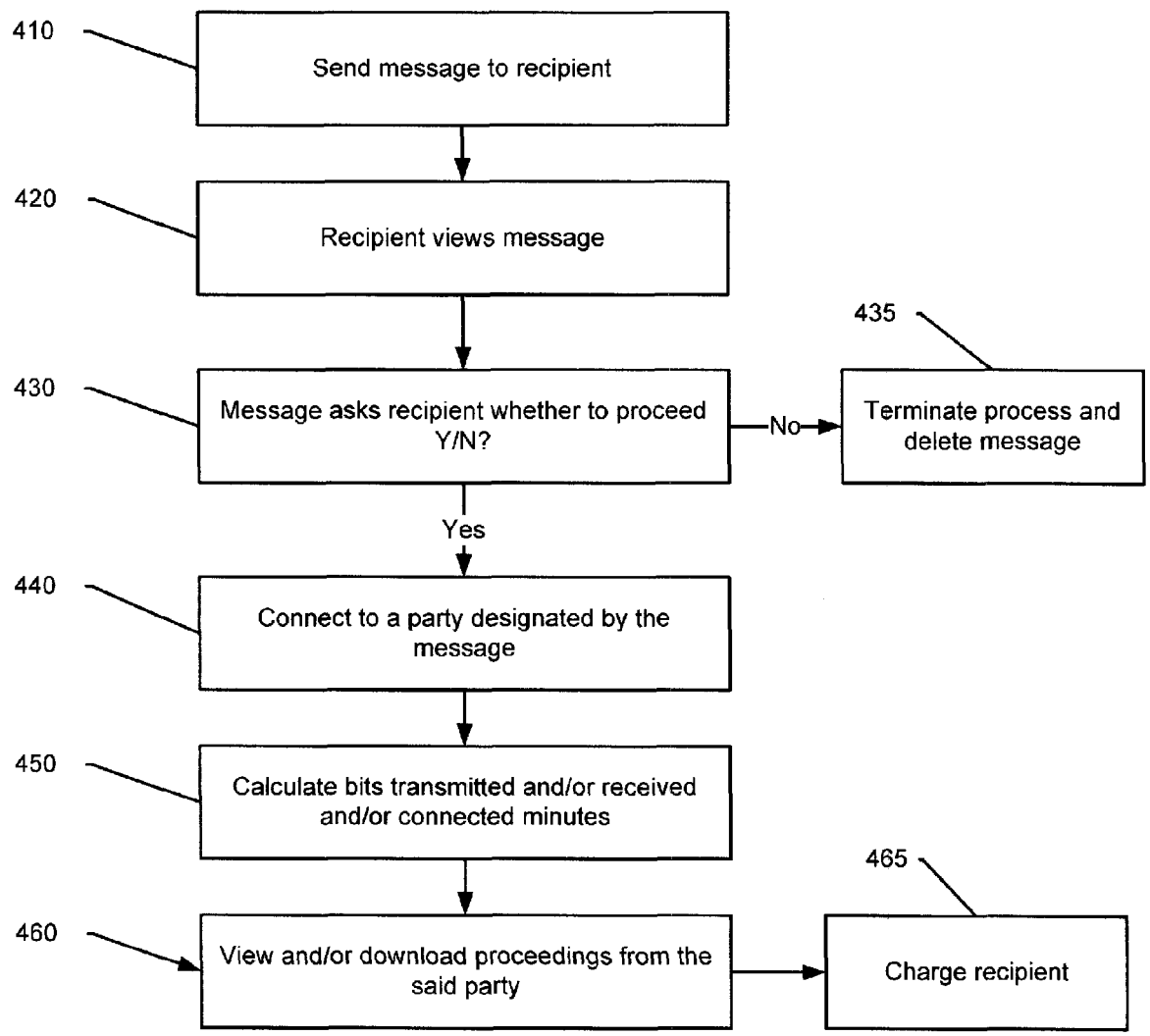
FIG. 4 presents a more developed embodiment of the invention as a flow diagram.

In the phase 410 of FIG. 4 a message is sent to a recipient. The recipient views the message in phase 420. In phase 430 the message asks whether the recipient wishes to proceed with the proposal. In some exemplary embodiments the proposal may be of the form: "A single by Beatles, "Yesterday" 50 cents, Interested Y/N?" In some exemplary embodiments the item to be sold is any data file, like a software program, movie in digital format, music in digital format, map in digital format, and/or any other document in digital format.

If "NO" the process is terminated and the message is deleted in phase 335. If "YES" the subscriber terminal automatically connects to a third party designated by the message. Any electronic address may be embedded in the message, in some exemplary embodiments.

After the user has been connected to the third party, he views, listens to, downloads, uploads and/or registers for proceedings in phase 450.

In phase 460 the bits transmitted and/or received and/or connected minutes are calculated. The calculation may be done by a software at the subscriber terminal or in the network or both.

In phase 465, money can be charged from the recipient on the basis of bits transmitted and/or received and/or connected minutes. In some exemplary embodiments, the charge is based on the price in the original message. In some exemplary embodiments the charge is added to the phone bill of the recipient. In some exemplary embodiments a bill is posted to the owner of the subscriber terminal. In some exemplary embodiments the credit card numbers are automatically exchanged and the account is automatically debited to complete the purchase. In some exemplary embodiments the credit card number of the subscriber is requested in a separate step of the proceedings.

In some exemplary embodiments the subscriber terminal is a mobile station, and the message is an SMS message. In some of these exemplary embodiments the said message or some parts of the said message are displayed in the telephony network operator logo, and/or the network cell logo. In these embodiments the subscriber terminal is typically a GSM mobile station.

In many embodiments of the described inventive methods permutations of phases are possible and in accordance with the invention.

Figure 5:
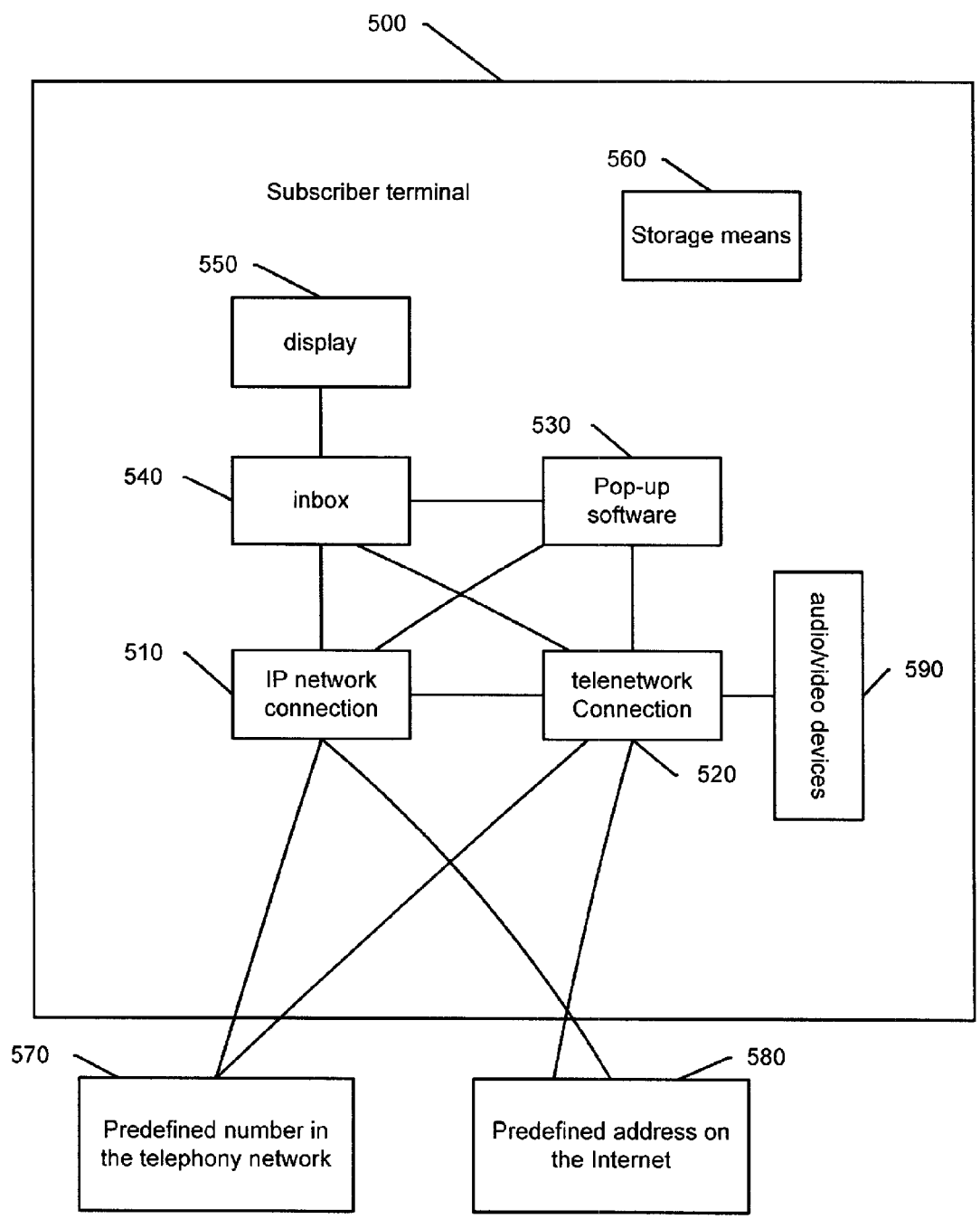
FIG. 5 presents a exemplary embodiment of the inventive advertising means.

FIG. 5 presents a exemplary embodiment of the subscriber terminal in accordance with the invention. The subscriber terminal is typically a PC computer, Apple Macintosh computer, a PDA (Personal Digital Assistant) or a UMTS-, GSM-, WAP-, Teldesic-, Inmarsat-, Iridium-, GPRS-, CDMA-, and/or WCDMA mobile station. Typically in some exemplary embodiments, the subscriber terminal is a device using either the Microsoft Windows, Windows NT, Windows CE, Windows Pocket PC, GEOS, Palm OS or the Epoc operating system. In many exemplary embodiments several default facilities of the operating system are used to realize the inventive advertising means.

In some exemplary embodiments the inventive subscriber terminal 500 comprises at least one packet switched connection 510 and/or telephony network connection 520, a display 550, at least one message inbox 540 and associated software 530.

The associated software 530 is arranged to recognize messages from the inbox 540. In some exemplary embodiments of the invention there is a single inbox for SMS-messages, voicemail and emails. This is especially the case with inventive subscriber terminals running the Epoc operating system. However, the associated software 530 can monitor several inboxes on the subscriber terminal or in the telephony network or the Internet.

In some exemplary embodiments the subscriber terminal is a PC computer, Apple Macintosh computer and/or a PDA (Personal Digital Assistant). In these exemplary embodiments the pop-up software typically monitors the email inbox of the user on a server on the Internet or the inbox on the subscriber terminal or both. When a special email is sent to the inbox 540, it contains an identifying element that the pop-up software 530 can recognize. Once this identifying element is recognized, the message or some parts of it is popped to the monitor 550. In some exemplary embodiments the message is displayed on the desktop of the computer. The message may read for example: "Pirelli tires 100$, interested Y/N?" In some exemplary embodiments the user presses Y to connect to the party for further proceedings. If he presses N, or some other key, or does nothing for a predefined time, the message disappears and is deleted.

In some exemplary embodiments the message is not delivered by email, but MMS is used instead. In some exemplary embodiments it may be delivered directly to the subscriber terminal by FTP, TCP/IP, H323, HTTP, UDP or by some other direct transfer protocol, and the pop-up software recognizes the said transmissions. In these embodiments the inbox is preferably not needed.

In all or some of the embodiments the display of the advert may be enhanced by audio and/or video by the audio/video devices 590. In some exemplary embodiments, the message is not deleted, but stored to the storage means 560. The storage means may be a hard drive, CD-ROM, computer disk, computer memory or any other electromagnetic storage means. In some exemplary embodiments this is done by moving the message and/or transmission to the "Recycle Bin" of the operating system.

In some exemplary embodiments the subscriber terminal is a WID (Wireless Information Device) that runs Epoc, Windows CE, Palm OS, GEOS, and/or Windows Pocket PC operating system. In some exemplary embodiments the message and/or the transmission is delivered by MMS, SMS, email, by FTP, TCP/IP, H323, HTTP, UDP or by some other direct data transfer protocol, and the pop-up software recognises the said transmissions and/or messages. In some exemplary embodiments the message or some parts of it are shown on at least one display of the smartphone by the pop-up software 530. In some exemplary embodiments the pop-up software 530 is arranged to use several application engines of the operating system. For example in Epoc, the pop-up software may introduce a completely new messaging subsystem. In some exemplary embodiments this is done simply by registering additional MTMs (Message Transfer Module). In Epoc, the MTMs are introduced by the Epoc Email app, which is arranged to support Internet mail SMTP, POP3, IMAP4, fax and SMS.

In some exemplary embodiments there is at least one special MTM, which recognises the messages that should be popped to the display. In some exemplary embodiments the messages are not necessarily adverts, but can be messages of any type.

Typically smartphones have one phone display and one computer display. In some exemplary embodiments the message or some parts of it are displayed in place of the telephony network operator logo, and/or the network cell logo, on the telephony display and/or on the computer display.

If the user is uninterested of the message, he may destroy it by pressing a key or by doing nothing for a predefined period. Once this option is realized the message is typically deleted and/or moved to the "Recycling bin."

The message typically embeds an electronic address, which can be contacted by a dedicated key if proceedings are desired. In some exemplary Epoc embodiments of the invention several application engines, dial up, NIFMAN, Internet protocols like PPP or other, and/or Web app are used automatically to realize the communications connection to the said third party.

In some exemplary embodiments the subscriber terminal is a GSM mobile station. In these exemplary embodiments the inbox 540 is typically a SMS inbox. The pop-up software 530 is embedded in the code of the mobile station. Once the message, typically an SMS message, or transmission, typically a DTMF-tone or a FTP, TCP/IP, H323, HTTP, UDP or some other direct transfer protocol transmission via GSM data, is received the message or some parts of it are displayed on the display 550. In some exemplary embodiments the message or some parts of it are displayed in place of the telephony network operator logo, and/or the network cell logo.

The message may read for example: "Pirelli tyres 100$, interested Y/N?" In some exemplary embodiments the user presses Y to connect to the party for further proceedings. If he presses N, or some other key, or does nothing for a predefined time, the message disappears and is deleted. In some embodiments indications may be changed, for example pressing # may indicate "Yes" in some exemplary embodiments.

Once "Yes" has been indicated the subscriber terminal will dial a number embedded in the message, or open a data connection, like GSM-data to an IP address, URL address or any other electronic address.

In many of the presented embodiments after the user has been connected to the party designated in the message, he views, listens to and/or registers for proceedings. The party may be for example the caller, and contact can be made on the basis of Caller ID in some exemplary embodiments. In some exemplary embodiments the proceedings may be a further advertisement on a web page, an audio and/or video presentation, a conversation with a sales representative and/or a registration for the receival of further information later by post, telephone, SMS and/or email.

In some exemplary embodiments, the subscriber terminal is arranged to play a sound, a beep and/or ring tone for example, upon arrival of the message and/or transmission. In some exemplary embodiments, the message and/or transmission may contain a ringtone, and/or a WAV- and/or an MP3-file, which is played at the recipient subscriber terminal. Alternatively in some embodiments the transmission may be arranged to trigger the playing of a particular file.

In some exemplary embodiments, the users can decline to accept incoming messages by a dedicated action that sends a signal to the network. In some exemplary embodiments this disables all or some parts of the information exchange between the Home Location Register of the cellular network and third parties. In some exemplary embodiments the user may invite incoming messages by enabling the network to transmit information from the Home Location Register to third parties. In many exemplary embodiments enabling and disabling are done by a dedicated signal recognized by the network. In some exemplary embodiments the signal is an email, SMS and/or an MMS message and/or a transmission delivered by FTP, TCP/IP, H323, HTTP and/or UDP and/or the transmission is a DTMF tone or a phone call.

The invention has been explained above with reference to the aforementioned embodiments and several commercial and industrial advantages of the invention have been demonstrated. With the method in accordance with the invention the recipient can receive advertisements or other short messages with the shortest manipulation time possible. No navigation, browsing of inboxes, copying and/or pasting of telephone numbers needs to be done. The user is shown the message automatically, and he may delete it or receive further information on it with one single press of a dedicated key.

The invention has been explained above with reference to the aforementioned embodiments. However, it is clear that the invention is not only restricted to these embodiments, but comprises all possible embodiments within the spirit and scope of the inventive thought and the following patent claims.

What is claimed is:

1. An electronic short messaging method for sending and receiving transmissions using the Internet and/or the telephony network, the method comprising the steps of:
   sending a first transmission to a recipient subscriber terminal for display, the first transmission defining one or more active alternatives including a first alternative for further action, the further action including a refund to the recipient;
   calculating costs associated with at least one of the first transmission and the one or more active alternatives; and
   sending a second transmission to the recipient subscriber terminal, the second transmission having a different transmission activity than the first transmission and depicting attributes related to at least one of user input, further actions, and a state of the first transmission.

2. The method according to claim 1, wherein unless the first alternative is selected, the first transmission is removed from a display of the recipient subscriber terminal at a predetermined time.

3. The method according to claim 1, wherein at least one of the first transmission and the second transmission contains at least one of a ringtone, WAV-file and an MP3-file, which is played at the recipient subscriber terminal.

4. The method according to claim 1, wherein the further actions include connecting to at least one of a telephone number, an IP-address, and a URL.

5. The method according to claim 1, wherein the recipient subscriber terminal is one of a computer, a Personal Digital Assistant and a UMTS, GSM, WAP, Teldesic, Inmarsat, Iridium, GPRS, CDMA or WCDMA mobile station, or a combination thereof.

6. The method according to claim 1, wherein the recipient subscriber terminal operates using at least one of Microsoft Windows, Windows NT, Windows CE, Windows Pocket PC, GEOS, Palm OS and an Epoc operating system.

7. The method according to claim 1, wherein money is charged to the recipient on the basis of the calculated costs.

8. The method according to claim 1, wherein the first transmission is at least one of an SMS transmission, a CB transmission, a USSD transmission, a PDS transmission, a WAPPush transmission, and an email, and is embedded with at least one of a phone number, an IP-address, and a URL-address.

9. The method according to claim 1, wherein the first transmission is at least one of an MMS transmission, an SMS transmission, a DTMF-tone, and a FTP, TCP/IP, H323, HTTP, or UDP data transfer and is embedded with at least one of a phone number, an IP-address, a URL-address, and a Session Initiation Protocol address.

10. The method according to claim 1, wherein the collect call is initiated by pressing a dedicated key on the recipient subscriber terminal.

11. An electronic short messaging device for collect calling, comprising:
    a transmitter and receiver structured to communicate using at least one of a packet switched connection and telephony network connection;
    at least one display device; and
    a processor structured to identify incoming transmissions and process the transmissions for displaying at least a part of the content of the transmission on the display device directly or at predetermined intervals,
    wherein the processor is further structured to process a first transmission of the transmissions, the first transmission defining one or more active alternatives including at least one of initiating a collect call and deleting the transmission, calculating costs associated with at least one of the first transmission and the one or more active alternatives, and
    wherein the transmitter is further configured to send a second transmission to the recipient subscriber terminal, the second transmission having a different transmission activity than the first transmission and depicting attributes related to at least one of user input, further actions, and a state of the first transmission.

12. The electronic short messaging device according to claim 11, wherein the processor is embodied on a SIM card.

13. The electronic short messaging device according to claim 11, wherein the electronic short messaging device is one of a computer, a Personal Digital Assistant and a UMTS, GSM, WAP, Teldesic, Inmarsat, Iridium, GPRS, CDMA or WCDMA mobile station, or a combination thereof.

14. The electronic short messaging device according to claim 12, wherein the electronic short messaging device operates using at least one of Microsoft Windows, Windows NT, Windows CE, Windows Pocket PC, GEOS, Palm OS and an Epoc operating system.

15. The electronic short messaging device according to claim 11, wherein the collect call is initiated by pressing a dedicated key on the recipient subscriber terminal.

16. A computer readable medium for collect calling, the computer readable medium including instructions executable by computer, the instructions for:
    receiving a first transmission at a recipient subscriber terminal for display, the first transmission defining one or more active alternatives executed by the instructions including at least one of initiating a collect call and deleting the transmission;

calculating costs associated with at least one of the first transmission and the one or more active alternatives; and receiving a second transmission that is associated with the first transmission, wherein the second transmission includes attributes including at least one of further actions to initiate the collect call and a state of the first transmission.

17. The computer readable medium according to claim 16, wherein the further actions include connecting to at least one of a telephone number, an IP-address, and a URL related to the collect call.

18. The computer readable medium according to claim 16, wherein the instructions are embodied on a SIM card.

\* \* \* \* \*